J. F. BROWN.
FENCE ATTACHMENT.
APPLICATION FILED NOV. 21, 1917.
1,270,112.
Patented June 18, 1918.
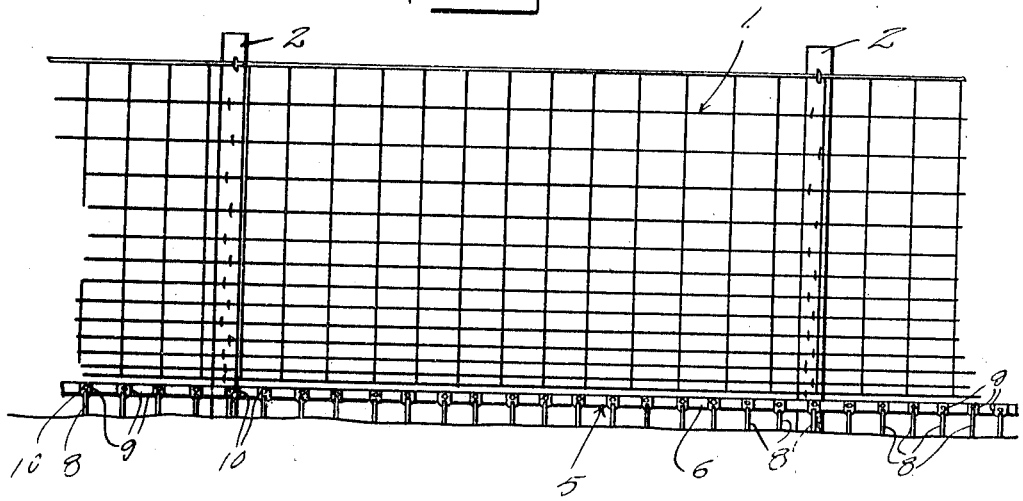
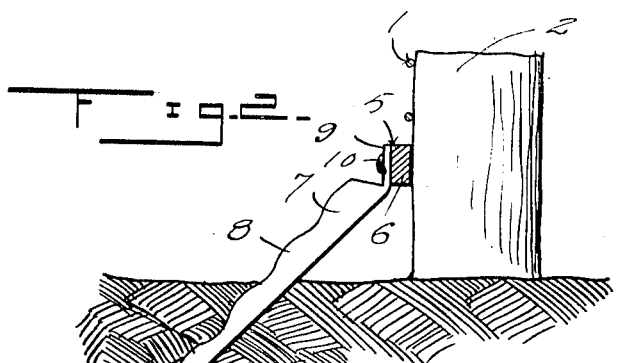
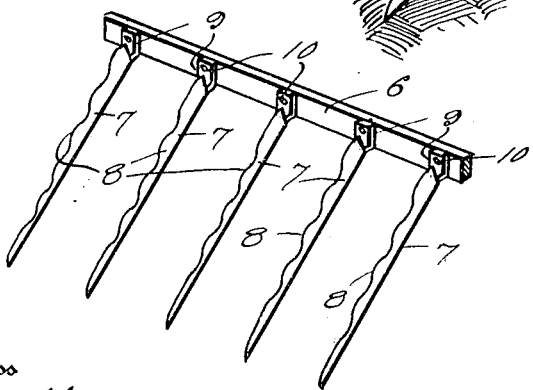
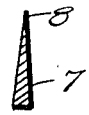
Inventor
J. F. Brown

UNITED STATES PATENT OFFICE.

JERRY F. BROWN, OF STERLING CITY, TEXAS.

FENCE ATTACHMENT.

1,270,112.  Specification of Letters Patent.  Patented June 18, 1918.

Application filed November 21, 1917. Serial No. 203,177.

*To all whom it may concern:*

Be it known that I, JERRY F. BROWN, a citizen of the United States, residing at Sterling City, in the county of Sterling and State of Texas, have invented certain new and useful Improvements in Fence Attachments; and I do hereby declare the following to be a full, clear, and exact description of the invention, such as will enable others skilled in the art to which it appertains to make and use the same.

This invention relates to an attachment for fences which is particularly designed for preventing wolves or other animals from digging under the fence.

The fence attachment is particularly designed for use on fences employed for retaining sheep or similar domestic animals in a pasture and it comprises a plurality of knives having their upper edges sharpened, which knives are attached to a suitable bar that is in turn attached to the post of the fence, and the knives extend into the ground so that in case a wolf or similar wild animal would endeavor to dig beneath the fence he would lacerate his paws and naturally desist from his endeavors to dig beneath the fence and gain access to the domestic animals within the pasture.

With the foregoing and other objects in view this invention consists in certain novel features of construction, combination and arrangement of parts as will be hereinafter more fully described and illustrated in the accompanying drawings and claimed.

In describing the invention in detail, reference will be had to the accompanying drawings wherein like characters designate like and corresponding parts throughout the several views, and in which:

Figure 1 is a view of a fence showing the improved attachment applied thereto.

Fig. 2 is a sectional view through a portion of the fence and showing both of the knife blades in side elevation.

Fig. 3 is a fragmentary perspective view of the attachment, and

Fig. 4 is a vertical section through one of the knife blades.

Referring more particularly to the drawings, 1 designates a wire fence of ordinary construction, such as is commonly employed for inclosing sheep pastures and which wire fence is carried by the usual type of fence posts 2.

The attachment, which is generically indicated by the numeral 5 comprises a supporting bar 6 which is attached in any suitable manner to the post 2 below the lower edge of the wire fence 1. The bar 6 has a plurality of knives 7 attached thereto, which knives extend outwardly and downwardly from the bar 6 at an acute angle and have their lower ends embedded in the ground outwardly from the fence 1. The upper edges 8 of the knives 7 are sharpened and preferably corrugated or sinuously cut, as clearly shown in Fig. 3 of the drawings, so as to increase the cutting surface of the knives and also insure the laceration of an animal's foot if it should endeavor to dig beneath the fence.

The blades 7 have attaching blade portions 9 formed upon their upper ends which are bent to lie at right angles to the blades 7 and are attached in any suitable manner such as by rivets 10 to the supporting or back bars 6.

In reducing the invention to practice, certain minor features of construction, combination and arrangement of parts may necessitate alterations to which the patentee is entitled provided such alterations are comprehended within the scope of what is claimed.

What is claimed is:

1. An attachment for fences comprising a back bar, a plurality of knife blades attached to said back bar and extending outwardly and downwardly from the back bar at an acute angle thereto.

2. The combination with an ordinary fence including fence posts, of a supporting bar attached to said posts, a plurality of knife blades attached to said bar in spaced relation to each other and extending outwardly and downwardly from the back bar at acute angles thereto, the outer lower ends of said knives adapted to be embedded in the ground.

3. The combination with an ordinary fence including fence posts, of a supporting bar attached to said posts, a plurality of knife blades, said knife blades positioned with their sharpened edges upwardly and extending outwardly and downwardly from the back bar at acute angles thereto, attaching plates formed upon said knife blades and positioned substantially at right angles to the blades, said attaching blades being secured to said supporting bar.

4. The combination with an ordinary fence including ordinary fence posts, of a supporting bar attached to said posts, a plurality of knife blades, said knife blades positioned with their sharpened edges upwardly and extending outwardly and downwardly from the back bar at acute angles thereto, attaching plates formed upon said knife blades and positioned substantially at right angles to the blades, said attaching blades being secured to said supporting bar, the upper surface of each knife being sharpened and corrugated.

In testimony whereof I affix my signature in presence of two witnesses.

JERRY F. BROWN.

Witnesses:
W. D. GRAHAM,
B. F. ROBERTS.

Copies of this patent may be obtained for five cents each, by addressing the "Commissioner of Patents, Washington, D. C."